United States Patent
Woltz et al.

(10) Patent No.: US 11,802,046 B2
(45) Date of Patent: Oct. 31, 2023

(54) HCL RECOVERY UNIT

(71) Applicant: SGL CARBON SE, Wiesbaden (DE)

(72) Inventors: Christian Woltz, Meitingen (DE);
Odón De Jesús Angeles Palacios, Meitingen (DE); Martin Kibili, Meitingen (DE); Christopher Leuschner, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 111 days.

(21) Appl. No.: 17/441,826

(22) PCT Filed: Mar. 24, 2020

(86) PCT No.: PCT/EP2020/058053
§ 371 (c)(1),
(2) Date: Sep. 22, 2021

(87) PCT Pub. No.: WO2020/165462
PCT Pub. Date: Aug. 20, 2020

(65) Prior Publication Data
US 2022/0194790 A1  Jun. 23, 2022

(30) Foreign Application Priority Data
Mar. 29, 2019  (DE) .............. 10 2019 204 498.0

(51) Int. Cl.
C01B 7/07 (2006.01)
B01D 3/14 (2006.01)
B01D 53/68 (2006.01)
B01D 53/14 (2006.01)

(52) U.S. Cl.
CPC ............ C01B 7/0737 (2013.01); B01D 3/143 (2013.01); B01D 53/68 (2013.01); *B01D 53/1456* (2013.01); *B01D 2257/2045* (2013.01)

(58) Field of Classification Search
CPC ....... C01B 7/0737; C01B 7/0712; C01F 7/22; B01D 3/143; B01D 3/148; B01D 53/68; B01D 53/1456; B01D 2257/2045
See application file for complete search history.

(56) References Cited

U.S. PATENT DOCUMENTS 2,345,696 A * 4/1944 Benning .............. C01B 7/01 95/193
3,260,059 A * 7/1966 Rosenberg ........... C01B 7/01 203/40
5,174,865 A 12/1992 Stultz et al.
2006/0099138 A1 5/2006 Walsdorff et al.
2007/0261437 A1 * 11/2007 Boonstra .............. C01B 7/0712 62/617
2016/0289099 A1 10/2016 Wallace

FOREIGN PATENT DOCUMENTS

| AU | 2014 253 487 A1 | 9/2015 | |
| AU | 2018 101 228 A4 | 9/2015 | |
| CN | 1 587 027 A * | 3/2005 | |
| CN | 107 010 647 A * | 8/2017 | .............. C01B 7/01 |
| EP | 0 003 713 A1 * | 8/1979 | ................ B01J 8/24 |
| WO | WO 2015 176 166 A1 * | 11/2015 | ............. C01F 7/306 |
| WO | 2018108811 A1 | 6/2018 | |

OTHER PUBLICATIONS

International Search Report dated Jun. 23, 2020 in corresponding International Application No. PCT/EP2020/058053; 5 pages.
German Office Action dated Jan. 8, 2020 in corresponding Application No. 10 2019 204 498.0; 13 pages.
De Dietrich Process Systems Gmbh- Reinigung von Chlorwasserstoff (HCI), Jul. 16, 2017, http://www. archive org;https://web.archive.org/web/20170716091930/http://wwvv.dedietrich.com/de/reinigung-vonhydrogen-chloride-hcl [online].
De Dietrich Process Systems Gmbh- Konzentrierung von Salzsäure., Sep. 11, 2013, http-//www.archive org;https://web. archive.org/web/20130911105436/http.//www.qvf.de/qvf-processsystems-de/mineralsäuren/Konzentrierung-von-Salzsäure.html [online].
Mersmann, Alfons, Kind, Matthias; Stichlmair, Johann: "Thermische Verfahrenstechnik—Grundlagen und Methoden 2nd edition.", Berlin Heidelberg—Springer Verlag, 2005. 569—612 Chapter 10. Konzeptuelle Prozessentwicklung ISBN 978-3540-23648-1, 45 pgs.

* cited by examiner

*Primary Examiner* — Timothy C Vanoy
(74) *Attorney, Agent, or Firm* — Maier & Maier, PLLC

(57) ABSTRACT

A unit for recovering hydrogen chloride from an aqueous liquid which includes hydrogen chloride and is contaminated with compounds of low or no volatility, the unit having an evaporation unit for forming, from the liquid, a vapour which contains hydrogen chloride and a liquid concentrate which is contaminated with the compounds of low or no volatility, a first distillation unit for separating the hydrogen-chloride-containing vapour into a first top product and a first bottom product, and a second distillation unit for separating a hydrogen-chloride-containing aqueous fluid into a second top product and a second bottom product, one of these two distillation units being configured to be able to implement therein a distillation above the ambient pressure, and the other of these two distillation units being configured to be able to implement therein a distillation below the ambient pressure.

15 Claims, 3 Drawing Sheets

US 11,802,046 B2

HCL RECOVERY UNIT

FIELD

The present invention relates to a unit and a method for recovering hydrogen chloride (HCl) from aqueous liquids which comprise hydrochloric acid and are contaminated with compounds of low or no volatility, which liquids are produced in particular as a by-product stream in the production of aluminium oxide.

BACKGROUND

Aluminium oxide can be recovered from bauxite. Predominantly used for this purpose is the Bayer process, wherein bauxite is digested under pressure with sodium hydroxide (e.g. 7 bar, 180° C.), insoluble contaminants are separated and aluminium hydroxide is precipitated from the supernatant. The aluminium hydroxide is converted to aluminium oxide by calcination. This process requires a lot of energy. When this process was developed, ores having a high aluminium content were available in sufficient quantities.

The ores containing aluminium that remain today sometimes have a significantly lower aluminium content. Alternative, efficient processes are being developed with which aluminium oxide can be obtained in the desired purity from the remaining ores.

In AU 2014 253 487 A1 and AU 2018 101 228 A4, processes are described that start with kaolin. Hydrogen chloride in the form of gas and in the form of hydrochloric acid is used in different process steps. The aluminium is extracted from the crushed and calcined ore using hydrochloric acid. Other metals contained in the ore also dissolve. Insoluble components, such as $SiO_2$, are then separated from the solution by solid-liquid separation. In addition to large amounts of dissolved aluminium, the supernatant obtained also contains other dissolved metals, for example traces of iron, magnesium, manganese, calcium, sodium and/or potassium. The aluminium is separated from the other dissolved metals by increasing the HCl content of the supernatant which is already hydrochloric acid (for example by introducing HCl gas), which causes aluminium chloride hexahydrate to precipitate. The aluminium chloride hexahydrate is separated from the supernatant of the aluminium chloride hexahydrate precipitation and is converted to alpha-aluminium oxide by heating to up to 1300° C., wherein roasting gas containing hydrogen chloride is expelled.

In such HCl-driven processes for aluminium oxide production, HCl-rich by-products or by-product streams arise. These include the supernatant from the aluminium chloride hexahydrate precipitation, which has a high HCl concentration and also contains aluminium that has not been co-precipitated and other metals that have not been co-precipitated. The hydrogen-chloride-containing roasting gas is also produced. It is very difficult to handle because it is very hot and highly corrosive. An entirely satisfactory proposal has not yet been made for handling these HCl-rich by-product streams.

SUMMARY

The object of the present invention is to provide a unit for the described, HCl-driven processes for aluminium oxide recovery, with the aid of which a high degree of purity of the aluminium oxide is ensured and, at the same time, particularly efficient process control is achieved. In particular, the unit, in cooperation with the HCl-driven process, should effectively counteract any carryover of metals contained in the ore into the aluminium oxide. This is to be achieved essentially without the supply of fresh HCl from outside and with the least possible disposal effort for by-products contaminated with hydrogen chloride.

This object is achieved by a unit for recovering hydrogen chloride from an aqueous liquid which comprises hydrochloric acid and is contaminated with compounds of low or no volatility, having
  an evaporation unit for forming, from the liquid, a vapour which contains hydrogen chloride and a liquid concentrate that is contaminated with the compounds of low or no volatility,
  a first distillation unit for separating the hydrogen-chloride-containing vapour into a first top product and a first bottom product, and
  a second distillation unit for separating a hydrogen-chloride-containing aqueous fluid into a second top product and a second bottom product, wherein
  one of these two distillation units is configured to be able to implement therein a distillation above the ambient pressure and the other of these two distillation units is configured to be able to implement therein a distillation below the ambient pressure, and
  the first distillation unit is in fluid-conducting communication with the second distillation unit such that at least part of the first bottom product is able to form at least part of the hydrogen-chloride-containing aqueous fluid.

The top product of the distillation unit, which is configured for a distillation above the ambient pressure, is very rich in hydrogen chloride and contains, for example, at least 90 wt. % hydrogen chloride. It is (virtually) free of contaminants of low or no volatility, such as metals. This top product can therefore preferably be used to precipitate an aluminium chloride hexahydrate from an aluminium-containing solution, for example from the supernatant obtained in the process of AU 2018 101 228 A4 after the separation of $SiO_2$. The top product replaces fresh HCl, which would otherwise have to be added. In certain units according to the invention, a droplet separating device is integrated through which the top product of the distillation unit, which is configured for a distillation above the ambient pressure, is passed. This makes it possible to achieve a total content of metal contaminants below 10 ppmw.

Any supernatant of an aluminium chloride hexahydrate precipitation caused by an increase in the HCl concentration, e.g. the supernatant of the aluminium chloride hexahydrate obtained in HCl-driven processes for recovering aluminium oxide, can be used as the aqueous liquid which comprises hydrochloric acid and is contaminated with compounds of low or no volatility. The contaminants of low or no volatility then include the aluminium that was not co-precipitated and the other metals that were not co-precipitated. However, with the aid of the invented unit, any other aqueous liquid which comprises hydrochloric acid and is contaminated with compounds of low or no volatility can also be treated; for example, any aqueous liquid which comprises hydrochloric acid and has been brought into contact with an ore in an acidic digestion.

Surprisingly, it was found that the first and/or second bottom product, which accumulate at the bottom of the distillation units when the unit according to the invention is operated, each represent ideal absorption liquids for the absorption of further hydrogen chloride. For example, in the process from AU 2018 101 228 A4, hydrogen-chloride-containing roasting gases are produced from which hydrogen chloride gas can be at least partially separated by absorption into at least one of the bottom products. Thus, the unit according to the invention is equally suitable for the treatment of aqueous liquids which comprise hydrochloric acid and are contaminated with compounds of low or no volatility, and for the treatment of gases containing hydrogen chloride.

The invention can be used universally in connection with any process in which HCl and/or hydrochloric acid are required and aqueous by-products which comprise hydrochloric acid and are contaminated with compounds of low or no volatility arise.

The present invention is not limited in terms of the type of evaporation unit. To form the hydrogen-chloride-containing vapour from the aqueous liquid, it is possible to use the evaporation units known to a person skilled in the art which are sufficiently corrosion-resistant with respect to hydrogen chloride and hydrochloric acid. Good results are achieved in particular when the hydrogen-chloride-containing vapour is formed from the aqueous liquid in an evaporation unit which comprises at least one evaporator selected from natural circulation evaporators, forced circulation evaporators, kettle evaporators, falling film evaporators and any combination of the above evaporators. Forced circulation evaporators are particularly preferred. There is particularly little crystallisation (fouling) therein. The liquid concentrate that is formed can then be further concentrated, so that a particularly small volume of liquid that is to be post-treated and is contaminated with compounds of low or no volatility, for example metals, is obtained. If the evaporation unit comprises a forced circulation evaporator, a flash evaporator may also be connected downstream thereof.

Although it is fundamentally possible within the scope of the present invention for the evaporation unit to have a multi-stage design, single-stage evaporation units are particularly preferred.

In contrast with single-stage, multi-stage means, in connection with the evaporation unit, that there is at least one upstream and one downstream evaporator stage. A part of the hydrogen-chloride-containing vapour is formed in the upstream evaporator stage. This part of the hydrogen-chloride-containing vapour provides at least a portion of the thermal energy for the operation of the downstream evaporator stage. In the downstream evaporator stage, a portion of the liquid that has not yet evaporated in the first evaporator stage is evaporated. The downstream evaporator stage is generally operated at a lower pressure and/or at a lower temperature than the upstream evaporator stage.

The single-stage evaporation unit is preferred because of the simplicity of the apparatus. In addition, the invention also realizes the energy recovery inherent in two-stage evaporation with a single-stage evaporation unit. This is because the hydrogen-chloride-containing vapour contributes to the heating of the bottom of the first distillation unit.

In order to protect the evaporation unit from corrosive attack by the aqueous liquid containing hydrochloric acid, inner surfaces of the evaporation unit that come into contact with the liquid and/or with the hydrogen-chloride-containing vapour are, at least in portions, preferably made of graphite, silicon carbide, carbon-fibre-containing composite materials, fluorinated polymers, enamel, glass, glass-fibre-reinforced plastic (FRP) and/or rubberised steels, wherein graphite, silicon carbide and/or polytetrafluoroethylene are particularly preferred. This increases the longevity of the evaporation unit. The graphite is preferably impregnated with resin such as phenolic resin. Polytetrafluoroethylene can be applied to inner surfaces as a coating or as a film.

When the evaporation unit is in operation, the liquid is concentrated to form the liquid concentrate. The evaporation unit preferably has a liquid draw-off for discharging the liquid concentrate that is formed. The term liquid concentrate expresses that the contaminants of low or no volatility are present in a higher concentration (i.e. with a higher mass fraction) therein than in the liquid. The liquid concentrate can also contain solids, for example dispersed metal salts. Discharging the liquid concentrate that is formed means that substances of low or no volatility, for example metal ions dissolved therein or dispersed metal salts, are not fed into one of the distillation units via the liquid draw-off. Ultimately, this allows a high-purity HCl gas to be generated.

The evaporation unit can have a phase separator. The vapour generated during evaporation flows into the phase separator. Liquid accumulates in the phase separator and is carried away by the vapour in the form of droplets. The phase separator preferably has a return line in order to return the accumulating liquid to the evaporation unit. This has the advantage that even fewer substances of low or no volatility, for example dissolved metal ions, are carried into the first distillation unit, in the bottom of which they would otherwise accumulate. The unit according to the invention becomes even more efficient because no bottom products or only a very small proportion thereof have to be discharged in order to counteract an undesirable accumulation of substances of low or no volatility, such as dissolved metal ions in the bottom products.

According to the invention, the evaporation unit is in fluid-conducting communication with the first distillation unit such that at least part of the hydrogen-chloride-containing vapour, preferably all of the hydrogen-chloride-containing vapour, can pass into the first distillation unit. The fluid-conducting communication between the two units can be provided, for example, by a line which leads from the evaporation unit to the first distillation unit. A droplet separating device can be integrated into the fluid-conducting communication. In the droplet separating device, droplets are separated which would otherwise carry certain amounts of substances of low or no volatility, for example dissolved metal ions, into the first distillation unit. Part of the hydrogen-chloride-containing vapour can also be diverted.

The fluid-conducting communication between the evaporation unit and the first distillation unit preferably opens into a lower region of the first distillation unit. It was found that heat that was used in the evaporation unit for evaporation can be brought into the first distillation unit with the vapour and used to heat the bottom when the fluid-conducting communication opens into the lower region of the first distillation unit. Surprisingly, this saves a large part of the energy that would otherwise have to be supplied externally to heat the bottom of the first distillation unit.

The unit according to the invention has a first distillation unit. Any distillation unit with which the hydrogen-chloride-containing vapour can be separated into the first top product and the first bottom product is suitable as the first distillation unit. The first top product is a lower-boiling gaseous fraction, and the first bottom product is a higher-boiling liquid fraction. The first distillation unit is preferably a first column.

The unit according to the invention also has a second distillation unit. Any distillation unit with which the hydrogen-chloride-containing aqueous fluid can be separated into the second top product and the second bottom product is suitable as the second distillation unit. The second top product is a lower-boiling gaseous fraction, and the second bottom product is a higher-boiling liquid fraction. The second distillation unit is preferably a second column.

A person skilled in the art knows internal fixtures, filler materials and linings that are sufficiently corrosion-resistant against the influence of hydrochloric acid and gases containing hydrogen chloride and equips the first and second distillation units or columns accordingly, for example by lining them with PTFE.

According to the invention, the first distillation unit is in fluid-conducting communication with the second distillation unit such that at least part of the first bottom product is able to form at least part of the hydrogen-chloride-containing aqueous fluid. The fluid-conducting communication of the two units can be provided, for example, by a line which leads from the bottom of the first distillation unit to the second distillation unit. The first bottom product then forms the hydrogen-chloride-containing aqueous fluid. A tank is preferably integrated into the line, wherein a portion of the line leads from a lower region of the tank to the second distillation unit. This ensures that a constant stream of aqueous fluid containing hydrogen chloride can be fed to the second distillation unit, even if fluctuations occur in upstream method steps. The statement that at least part of the first bottom product is able to form at least part of the hydrogen-chloride-containing aqueous fluid expresses that the fluid-conducting communication can have a branch, for example, and a branchable part of the first bottom product is not fed to the second distillation unit, but is discharged from the unit, for example to remove contaminants of low or no volatility (carried along in the evaporation unit during evaporation). Alternatively or additionally, a further fluid can be fed to the fluid-conducting communication, for example via a feed line opening into the line or the tank, so that a further part of the hydrogen-chloride-containing aqueous fluid that is not formed from the first bottom product goes back to a feedable liquid.

According to the invention, the two distillation units are configured differently. One of the two distillation units is configured to be able to implement therein a distillation above the ambient pressure and the other of these two distillation units is configured to be able to implement therein a distillation below the ambient pressure.

Distillation units such as columns configured for operation above the ambient pressure must be sealed to prevent fluid from flowing out from the inside to the outside. In addition, their walls must be designed overall in such a way that they can absorb the tensile loads associated with the overpressure without deforming.

In contrast distillation units such as columns configured for operation below the ambient pressure must be sealed to prevent the inflow of ambient air into the column. In addition, their walls must be designed overall in such a way that they can withstand the pressure load associated with the negative pressure without deformation.

The first distillation unit can be designed to separate a fluid that can be returned into the distillation unit and the hydrogen-chloride-containing vapour into the first top product and the first bottom product. In addition to the inlet for the hydrogen-chloride-containing vapour, it then has an additional inlet for the returnable fluid, which is preferably arranged above the inlet for the hydrogen-chloride-containing vapour. In general the second distillation unit is then in fluid-conducting communication with the first distillation unit in such a way that at least part of the second bottom product is able to form at least part of the returnable aqueous fluid. The fluid-conducting communication of the two units can be provided, for example, by a line which leads from the bottom of the second distillation unit to the first distillation unit. The second bottom product then forms the returnable aqueous fluid. A tank is preferably integrated into the line, wherein a portion of the line leads from a lower region of the tank to the first distillation unit. This ensures that a constant stream of the aqueous fluid can be fed to the first distillation unit, even if fluctuations occur in the second distillation unit. The statement that at least part of the second bottom product is able to form at least part of the returnable aqueous fluid expresses that the fluid-conducting communication can have a branch, for example, and a branchable part of the second bottom product is not fed to the first distillation unit, but rather is discharged from the unit according to the invention. Alternatively or additionally, a further fluid can be fed to the fluid-conducting communication, for example via a feed line opening into the line or the tank, so that a further part of the returnable aqueous fluid that is not formed from the second bottom product goes back to a feedable liquid.

According to a particular embodiment of the units according to the invention for recovering hydrogen chloride, a hydrochloric acid extraction unit can be provided through which part of one of the bottom products or of the hydrogen-chloride-containing vapour can be conveyed. Suitable hydrochloric acid extraction units are the branches mentioned herein or the tanks. The extracted hydrochloric acid can be recycled into an HCl-driven process for the recovery of aluminium oxide and used e.g. to dissolve aluminium out of the crushed and calcined ore.

However, according to the invention it is particularly preferred to obtain all hydrochloric acid and all hydrogen chloride gas that is to be recycled into the HCl-driven process for the recovery of aluminium oxide from the top product of the distillation unit configured to operate above the ambient pressure, if necessary with the supply of water in order to form the hydrochloric acid. This ensures that virtually no contaminants of low or no volatility are recycled into aluminium oxide recovery. This ensures that the aluminium oxide is particularly pure.

It was emphasized above that the first and/or the second bottom product, which accumulates at the bottom of the distillation units when the unit according to the invention is operated, each represent ideal absorption liquids for the absorption of further hydrogen chloride. Building on this, a preferred embodiment of the unit according to the invention is proposed which is also suitable for recovering hydrogen chloride from gas containing hydrogen chloride, having an absorption unit for absorbing hydrogen chloride gas from the gas into an absorbent so as to obtain a hydrogen-chloride-enriched absorbent and a hydrogen-chloride-depleted gas. The hydrogen-chloride-containing gas can be, for example, a roasting gas produced in HCl-driven processes for aluminium oxide production. At least one of the distillation units is preferably in fluid-conducting communication with the absorption unit such that at least part of at least one of the two bottom products is able to serve as an absorbent in the absorption unit.

Any unit that allows measurable absorption of hydrogen chloride in an absorption liquid can be considered as the absorption unit. This is regularly the case whenever even just a little intensive contact is established between the hydrogen-chloride-containing gas and one of the bottom products. A quencher, for example, can also serve as the absorption unit. Preferred absorption units have internal fixtures and/or packings which cause close mass transfer contact between gas and liquid.

The absorption unit can be an absorption unit with a countercurrent flow of roasting gas and absorbent or with a concurrent flow of roasting gas and absorbent.

A further aspect of the invention thus relates to the use of hydrochloric acid for the absorption of hydrogen chloride from a hydrogen-chloride-containing gas formed during a thermal decomposition. The hydrochloric acid used for absorption preferably contains at least 21 wt. %, in particular at least 22 wt. %, of hydrogen chloride. This figure relates to the hydrochloric acid present before absorption. The thermal decomposition comprises, for example, a thermal decomposition of a metal chloride, for example in the presence of water, preferably a thermal decomposition of a metal chloride hydrate, in particular the thermal decomposition of aluminium chloride hexahydrate. The protons required according to the relevant stoichiometry for the complete conversion of the chloride ions to HCl can therefore originate, for example, completely or partially from water molecules which are coordinated in hydration shells of certain metal chloride hydrates. The absorption can take place in an absorption unit with a countercurrent flow of gas and hydrochloric acid or with a concurrent flow of gas and hydrochloric acid.

The second distillation unit is preferably in fluid-conducting communication with the absorption unit such that at least part of the second bottom product can serve as an absorbent in the absorption unit. The second distillation unit can, for example, be in fluid-conducting communication with the first distillation unit via the absorption unit so that the second bottom product is able to function as an absorbent and the hydrogen-chloride-enriched absorbent is able to form at least part of the returnable aqueous fluid. Alternatively, the absorption unit can be integrated into a bottom circulation of a distillation unit (preferably the second distillation unit) in such a way that part of the bottom product of this distillation unit (preferably the second bottom product) is able to function as an absorbent.

In a particularly preferred embodiment, the absorption unit is in fluid-conducting communication with the distillation unit which is configured to be able to implement therein a distillation below the ambient pressure such that the hydrogen-chloride-depleted gas can be withdrawn from the absorption unit into this distillation unit. The fluid-conducting communication of the absorption unit with this distillation unit is preferably on the gas side, so that the reduced pressure prevailing in the distillation unit allows a steady flow of gas from the absorption unit into this distillation unit, for example via a valve. This in turn leads to a subsequent flow of hydrogen-chloride-containing gas (for example roasting gas) into the absorption unit. This particularly preferred embodiment has the surprising advantage that the escape of roasting gas into the environment can be particularly reliably avoided. Any plant part of a plant for the production of aluminium oxide that generates and carries roasting gas can then be configured for operation under ambient pressure. This is done in a particularly economical way using the negative pressure that prevails in the distillation unit operated under ambient pressure.

In a preferred unit according to the invention, the first distillation unit is configured to be able to implement therein a distillation above the ambient pressure and the second distillation unit is configured to be able to implement therein a distillation below the ambient pressure.

In another unit according to the invention, the second distillation unit is configured to be able to implement therein a distillation below the ambient pressure and the first distillation unit is configured to be able to implement therein a distillation below the ambient pressure.

The invention also relates to a method for recovering hydrogen chloride from an aqueous liquid which comprises hydrochloric acid and is contaminated with compounds of low or no volatility, wherein a vapour which contains hydrogen chloride and a liquid concentrate that is contaminated with the compounds of low or no volatility are formed from the liquid in an evaporation unit, the hydrogen-chloride-containing vapour is separated in a first distillation unit into a first top product and a first bottom product, a hydrogen-chloride-containing aqueous fluid is separated in a second distillation unit into a second top product and a second bottom product, wherein a distillation above the ambient pressure is implemented in one of these two distillation units and a distillation below the ambient pressure is implemented in the other of these two distillation units, and the first bottom product forms at least part of the hydrogen-chloride-containing aqueous fluid.

In general, at least part of the second bottom product is returned to the first distillation unit.

Preferably, the method is not an extractive distillation method. The bottom products of both distillation units are substantially free of additives, such as salts, or contain significantly lower concentrations of salts based on the output streams. The proportion of additives other than hydrogen chloride and water in the two bottom products is preferably at most 20 wt. %, particularly preferably at most 6 wt. % and very particularly preferably at most 3 wt. %. This has the effect that the HCl top product of the distillation unit operated above the ambient pressure is almost completely free of entrained contaminants due to additives, and it was surprisingly found that this is the only reason why aluminium oxide can be reliably obtained in the desired degrees of purity.

In certain methods according to the invention, the top product of the distillation unit in which the distillation is implemented above the ambient pressure is passed through a droplet separating device. This allows the total level of metal contaminants in this top product to be reduced to below 10 ppmw.

The aqueous liquid which comprises hydrochloric acid and is contaminated with compounds of low or no volatility generally has at least 0.5 wt. %, for example at least 1 wt. %, of dissolved metals and a hydrogen chloride content of at least 10 wt. %, in particular at least 15 wt. %, preferably at least 20 wt. %, for example at least 25 wt. %.

The aqueous liquid which comprises hydrochloric acid and is contaminated with compounds of low or no volatility can contain 0.1 to 12 wt. %, in particular 0.3 to 9 wt. %, for example 0.5 to 7 wt. % of aluminium; and 0.1 to 12 wt. %, in particular 0.3 to 9 wt. %, for example 0.5 to 7 wt. %, of other metals; and 10 to 37 wt. %, in particular 15 to 35 wt. %, for example 20 to 35 wt. %, of hydrogen chloride. In the liquid, the metals are present as ions, for example with a hydration shell or with coordinated or otherwise associated chloride counter-ions.

The mass fractions of aluminium and other metals refer in each case to the aluminium or metal salt present as chloride in the highest, stable oxidation state of the relevant metal (iron is therefore considered as $FeCl_3$). The mass fraction of other metals refers to the sum of the mass fractions of all metals other than aluminium. According to a particularly preferred embodiment of the method according to the invention, the aqueous liquid which comprises hydrochloric acid and is contaminated with compounds of low or no volatility is formed by increasing the hydrogen chloride content of an aluminium-rich aqueous solution, for example by introducing a gas containing HCl, and the aluminium chloride which precipitates is separated through solid-liquid separation. The HCl-containing gas is preferably formed at least partially from the top product of the distillation unit in which the distillation above the ambient pressure is implemented.

The embodiments of the invention described herein in connection with the unit according to the invention also apply in connection with the method according to the invention and vice versa.

The method according to the invention is preferably also used to recover hydrogen chloride from a gas containing hydrogen chloride, for example roasting gas containing hydrogen chloride, wherein the hydrogen-chloride-containing gas is brought into contact with an absorbent in an absorption unit. The absorbent can then be formed at least partially from at least part of at least one of the two bottom fractions, for example. It goes without saying that bottom fraction is synonymous here with bottom product.

The first distillation unit is preferably operated above the ambient pressure, and the second distillation unit is preferably operated below the ambient pressure. Alternatively, the second distillation unit can be operated above the ambient pressure and the first distillation unit can be operated below the ambient pressure. A person skilled in the art knows how the particular distillation unit can be configured for overpressure or underpressure operation.

The invention also relates to a set, for example an assembly, for setting up a unit according to the invention for recovering hydrogen chloride from an aqueous liquid which comprises hydrochloric acid and is contaminated with compounds of low or no volatility; comprising the evaporation unit (30), having
an inlet,
an outlet and
a liquid draw-off,
the first distillation unit (10), having
an inlet,
an upper outlet and
a lower outlet,
the second distillation unit (20), having
an inlet,
an upper outlet and
a lower outlet,
wherein one of these two distillation units is configured to be able to implement therein a distillation above the ambient pressure and the other of these two distillation units is configured to be able to implement therein a distillation below the ambient pressure, and the set, e.g. the assembly, is configured for an interconnection of the evaporation unit and the two distillation units, as described for the unit according to the invention. The set, e.g. the assembly, can include a connecting element, e.g. a line for establishing a fluid-conducting communication from the outlet of the evaporation unit to the inlet of the first distillation unit and/or a connecting element for establishing a fluid-conducting communication from the lower outlet of the first distillation unit to the inlet of the second distillation unit.

It goes without saying that the set, for example the assembly, can also comprise the absorption unit described herein. The absorption unit then typically has a liquid inlet, a liquid outlet, a gas inlet and a gas outlet. The set, for example the assembly, with the absorption unit is then designed to be interconnected with the evaporation unit and the two distillation units, as described for a unit according to the invention with an absorption unit. The set, for example the assembly, can also comprise at least one connecting element with which a fluid-conducting communication can be established from at least one lower outlet of one of the distillation units to the liquid inlet of the absorption unit.

The embodiments of the invention described herein in connection with the unit according to the invention also apply in connection with the set according to the invention, for example in connection with the assembly according to the invention, and vice versa.

BRIEF DESCRIPTION OF THE FIGURES

The invention is illustrated by means of the following figures, without being restricted thereto.

DETAILED DESCRIPTION

Figure 1:
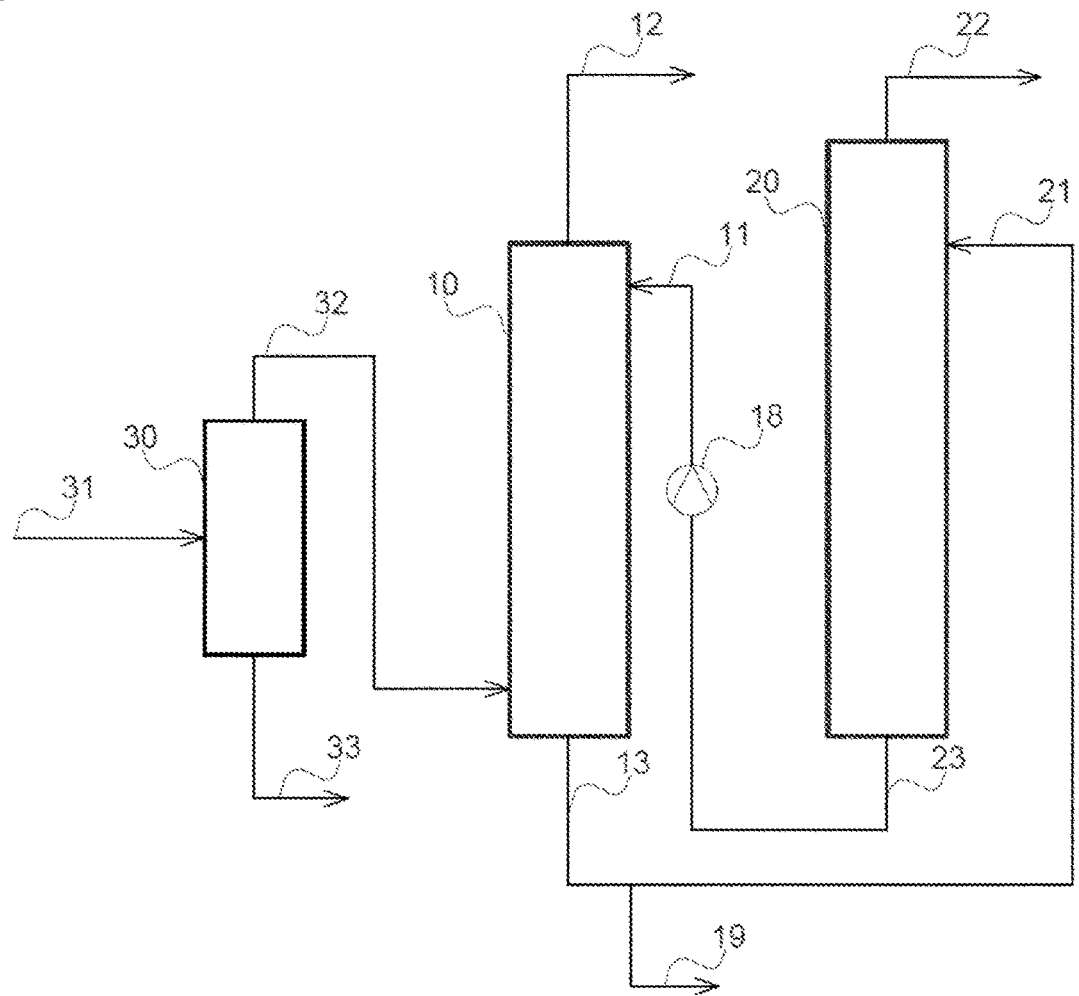
FIG. 1 shows an embodiment of the unit according to the invention for recovering HCl.

FIG. 1 shows a unit 1 for recovering hydrogen chloride from an aqueous liquid 31 which comprises hydrochloric acid and is contaminated with compounds of low or no volatility (in this case dissolved aluminium and other metals). The unit 1 has an evaporation unit 30 for forming a hydrogen-chloride-containing vapour 32 and a liquid concentrate 33 from the liquid 31. Details of the evaporation unit, such as the heating unit for providing the heat required for evaporation, a phase separator for returning entrained metal-containing liquid droplets, are not shown. The unit 1 also has a first distillation unit 10 for separating the hydrogen-chloride-containing vapour 32 into a first top product 12 and a first bottom product 13. The unit 1 also has a second distillation unit 20 for separating a second hydrogen-chloride-containing aqueous fluid 21 into a second top product 22 and a second bottom product 23. The hydrogen-chloride-containing aqueous fluid 21 is formed from the first bottom product 13, wherein a substream 19 of the first bottom product 13 is discharged in order to counteract an accumulation of metal contaminants in the distillation units. The fluid 11 returned into an upper region of the first distillation unit 10 is formed from the second bottom product 23. The distillation units 10, 20 shown in the figures are columns. For the sake of simplicity, heating units for heating the column bottoms and cooling units for cooling the column tops are not shown. In the example illustrated here, the first distillation unit 10 is configured to be able to implement therein a distillation above the ambient pressure. The second distillation unit 20 is configured to be able to implement therein a distillation below the ambient pressure. The pump 18 conveys the bottom product 23 against a pressure gradient. The seals, wall thicknesses and column materials required for the particular operating pressure of the relevant column are not indicated. The linings of the various units, which are resistant to the action of hydrochloric acid or hydrogen chloride gas, are also not shown. Tanks and heat exchangers are also not shown.

Figure 2:
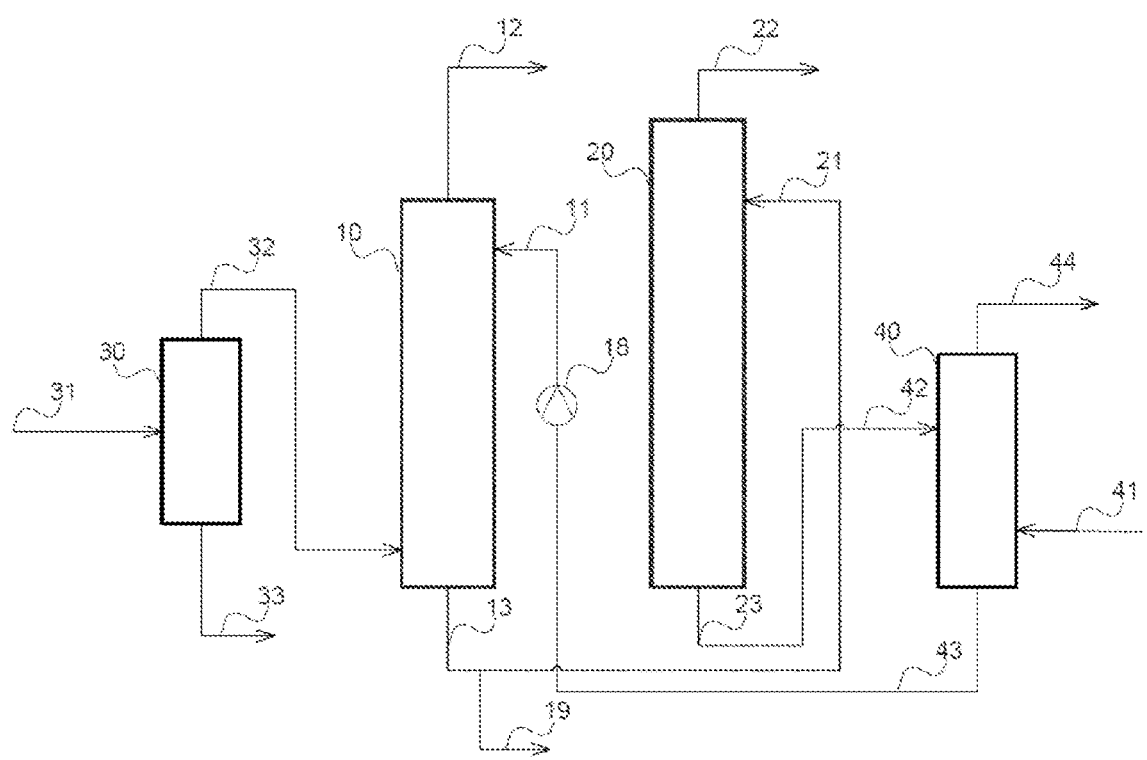
FIG. 2 shows an embodiment of the unit according to the invention for recovering HCl.
Figure 3:
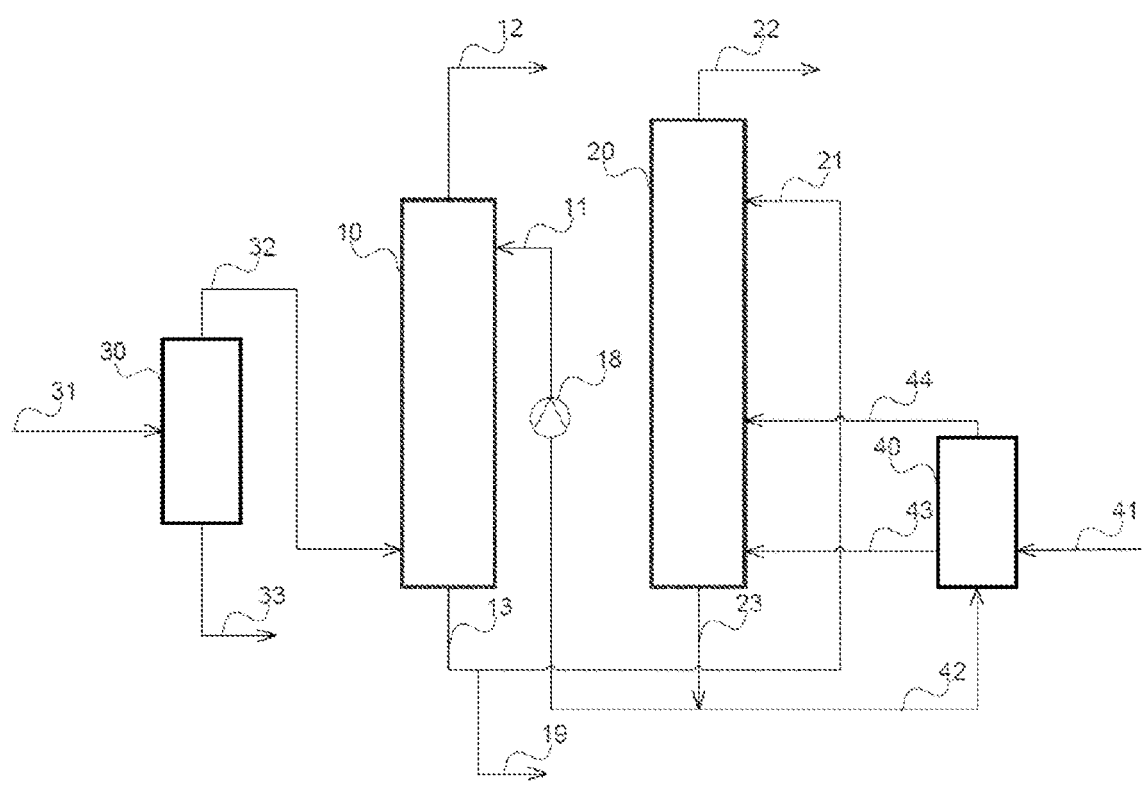
FIG. 3 shows an embodiment of the unit according to the invention for recovering HCl.

In FIGS. 2 and 3, the same reference signs have the same meaning as in FIG. 1. The units 1 according to the invention shown in FIGS. 2 and 3 for recovering hydrogen chloride also have an absorption unit 40. The absorption unit serves to absorb hydrogen chloride from a gas 41 containing hydrogen chloride (e.g. roasting gas) into an absorbent 42 so as to obtain a hydrogen-chloride-enriched absorbent 43 and a hydrogen-chloride-depleted gas 44.

In the unit 1 of FIG. 2, the second distillation unit 20 is in fluid-conducting communication with the absorption unit 40 in such a way that the second bottom product 23 serves as an absorbent 42 in the absorption unit 40. The absorption unit 40 is in fluid-conducting communication with the first distillation unit 10 so that the hydrogen-chloride-enriched absorbent 43 forms the returned fluid 11. A part of the second bottom product 23 that has not transitioned into the hydrogen-chloride-depleted gas 44 in the absorption unit 40 therefore forms a part of the returned aqueous fluid 11, wherein the fluid 11 also includes absorbed portions of the hydrogen-chloride-containing gas 41. In the absorption unit 40, the absorbent 42 is conducted from top to bottom in countercurrent to the rising gas 41.

In the unit 1 of FIG. 3, the absorption unit 40 is integrated in the bottom circulation of the second distillation unit 20 in such a way that part of the second bottom product 23 acts as an absorbent 42. The hydrogen-chloride-depleted gas 44 is extracted in the second distillation unit 20, which—as described above for FIG. 1—is configured to be able to implement therein a distillation below the ambient pressure.

LIST OF REFERENCE SIGNS unit for recovering hydrogen chloride 1
first distillation unit 10
returnable fluid 11
first top product 12
first bottom product 13
pump 18
substream 19
second distillation unit 20
hydrogen-chloride-containing aqueous fluid 21
second top product 22
second bottom product 23
evaporation unit 30
aqueous liquid which comprises hydrochloric acid and is contaminated with compounds of low or no volatility 31
hydrogen-chloride-containing vapour 32
liquid concentrate 33
absorption unit 40
hydrogen-chloride-containing gas 41
absorbent 42
hydrogen-chloride-enriched absorbent 43
hydrogen-chloride-depleted gas 44

The invention claimed is:

1. A unit for recovering hydrogen chloride from an aqueous liquid which comprises hydrochloric acid and is contaminated with compounds of no volatility or of a volatility insufficient to form a vapour in an evaporation unit, said unit comprising:
   an evaporation unit for forming, from the liquid, a vapour which contains hydrogen chloride and a liquid concentrate that is contaminated with the compounds of no volatility or a volatility insufficient to form a vapour in the evaporation unit,
   a first distillation unit for separating the hydrogen-chloride-containing vapour into a first top product and a first bottom product, and
   a second distillation unit for separating a hydrogen-chloride-containing aqueous fluid into a second top product and a second bottom product, wherein the evaporation unit includes a liquid draw-off configured to discharge the liquid concentrate so that the liquid concentrate contaminated with the compounds of no volatility or of a volatility insufficient to form a vapour in the evaporation unit are not fed into one of these two distillation units,
one of these two distillation units is configured to be able to implement therein a distillation above the ambient pressure and the other of these two distillation units is configured to be able to implement therein a distillation below the ambient pressure, and
the first distillation unit is in fluid-conducting communication with the second distillation unit such that at least part of the first bottom product is able to form at least part of the hydrogen-chloride-containing aqueous fluid.

2. The unit according to claim 1, having
a first distillation unit for separating a fluid which can be returned into the distillation unit and the hydrogen-chloride-containing vapour into the first top product and the first bottom product, wherein
the second distillation unit is in fluid-conducting communication with the first distillation unit in such a way that at least part of the second bottom product is able to form at least part of the returnable aqueous fluid.

3. The unit according to claim 1 for recovering hydrogen chloride from an aqueous liquid which comprises hydrochloric acid and is contaminated with compounds of no volatility or of a volatility insufficient to form a vapour in the evaporation unit and for recovering hydrogen chloride from a hydrogen-chloride-containing gas, further comprising:
an absorption unit for absorbing hydrogen chloride gas from the gas into an absorbent so as to obtain a hydrogen-chloride-enriched absorbent and a hydrogen-chloride-depleted gas.

4. The unit according to claim 3, wherein at least one of the distillation units is in fluid-conducting communication with the absorption unit such that at least part of at least one of the two bottom products is able to serve as an absorbent in the absorption unit.

5. The unit according to claim 4, wherein the second distillation unit is in fluid-conducting communication with the absorption unit such that at least part of the second bottom product is able to serve as an absorbent in the absorption unit.

6. The unit according to claim 5, wherein the absorption unit is integrated into a bottom circulation of the second distillation unit such that part of the second bottom product is able to function as an absorbent.

7. The unit according to claim 3, wherein the second distillation unit is in fluid-conducting communication with the first distillation unit via the absorption unit such that the second bottom product is able to function as an absorbent and the hydrogen-chloride-enriched absorbent is able to form at least part of the returnable aqueous fluid.

8. The unit according to claim 3, wherein the absorption unit is in fluid-conducting communication with the distillation unit which is configured to be able to implement therein a distillation below the ambient pressure such that the hydrogen-chloride-depleted gas can be withdrawn from the absorption unit into this distillation unit.

9. The unit according to claim 1, wherein the first distillation unit is configured to be able to implement therein a distillation above the ambient pressure and the second distillation unit is configured to be able to implement therein a distillation below the ambient pressure.

10. The unit according to claim 1, wherein the second distillation unit is configured to be able to implement therein a distillation above the ambient pressure and the first distillation unit is configured to be able to implement therein a distillation below the ambient pressure.

11. A method for recovering hydrogen chloride from an aqueous liquid which comprises hydrochloric acid and is contaminated with compounds of low or no volatility, comprising:
- forming from the liquid in the evaporation unit a vapour which contains hydrogen chloride and a liquid concentrate that is contaminated with compounds of no volatility or of a volatility insufficient to form a vapour in the evaporation unit,
- discharging the liquid concentrate via a liquid draw-off of the evaporation unit,
- separating in a first distillation unit the hydrogen-chloride-containing vapour into a first top product and a first bottom product,
- separating in a second distillation unit a hydrogen-chloride-containing aqueous fluid into a second top product and a second bottom product, wherein
- the evaporation unit includes the liquid draw-off to discharge the liquid concentrate so that the liquid concentrate contaminated with the compounds of no volatility or of a volatility insufficient to form a vapour in the evaporation unit are not fed into one of these two distillation units, and
- a distillation above the ambient pressure is implemented in one of these two distillation units and a distillation below the ambient pressure is implemented in the other of these two distillation units, and the first bottom product forms at least part of the hydrogen-chloride-containing aqueous fluid.

12. The method according to claim 11, for recovering hydrogen chloride from an aqueous liquid which comprises hydrochloric acid and is contaminated with compounds of no volatility or of a volatility insufficient to form a vapour in the evaporation unit and for recovering hydrogen chloride from gas containing hydrogen chloride, wherein the hydrogen-chloride-containing gas is brought into contact with an absorbent in an absorption unit.

13. A method for absorbing hydrochloric acid, comprising a step of absorbing hydrogen chloride from a hydrogen-chloride-containing gas formed during a thermal decomposition in a unit according to claim 3.

14. The method according to claim 13, wherein the thermal decomposition comprises a thermal decomposition of aluminium chloride hexahydrate.

15. An assembly for the unit according to claim 1; comprising
   the evaporation unit, having
   an inlet,
   an outlet, and
   a liquid draw-off,
   the first distillation unit, having
   an inlet,
   an upper outlet, and
   a lower outlet,
   the second distillation unit, having
   an inlet,
   an upper outlet, and
   a lower outlet
wherein one of these two distillation units is configured to be able to implement therein a distillation above the ambient pressure and the other of these two distillation units is configured to be able to implement therein a distillation below the ambient pressure,
and the assembly is designed to interconnect the evaporation unit and the two distillation units to form a unit.

* * * * *